(12) United States Patent
Dederichs et al.

(10) Patent No.: US 11,840,412 B2
(45) Date of Patent: Dec. 12, 2023

(54) HANDLING SYSTEM FOR THE AUTOMATIC TRANSFER AND SEPARATION OF LOAD CARRIERS

(71) Applicant: Ford-Werke GmbH, Cologne (DE)

(72) Inventors: Andre Dederichs, Wesseling-Urfeld (DE); Andreas Hartwig, Cologne (DE)

(73) Assignee: Ford-Werke GmbH, Cologne (DE)

( * ) Notice: Subject to any disclaimer, the term of this patent is extended or adjusted under 35 U.S.C. 154(b) by 3 days.

(21) Appl. No.: 17/481,499

(22) Filed: Sep. 22, 2021

(65) Prior Publication Data

US 2022/0089387 A1 Mar. 24, 2022

(30) Foreign Application Priority Data

Sep. 22, 2020 (DE) .......................... 102020211816.7

(51) Int. Cl.
*B65G 67/04* (2006.01)
*B60P 1/43* (2006.01)
(Continued)

(52) U.S. Cl.
CPC ................ *B65G 67/04* (2013.01); *B60P 1/43* (2013.01); *B65G 1/08* (2013.01); *B65G 47/8815* (2013.01)

(58) Field of Classification Search
CPC .......... B65G 67/04; B65G 67/22; B65G 1/08; B65G 1/0492; B65G 47/8815;
(Continued)

(56) References Cited

U.S. PATENT DOCUMENTS 3,750,804 A * 8/1973 Lemelson ........... G07F 11/1657
414/280
4,004,701 A * 1/1977 Moses ..................... B65G 1/08
414/286
(Continued)

FOREIGN PATENT DOCUMENTS

JP 2020040761 A * 3/2020
WO 2020050309 3/2020

OTHER PUBLICATIONS

Mir Mobile Industrial Robots, A Fleet of MIR200 Robots Boosts Productivity at Whirlpool, YouTube Video, Oct. 21, 2019, available at URL https://www.youtube.com/watch?v=hGOLQXaFCXQ.

*Primary Examiner* — Glenn F Myers
(74) *Attorney, Agent, or Firm* — Burris Law, PLLC

(57) ABSTRACT

A handling system includes a gravity feed rack, a pick-up rack, a front retaining element, and a rear retaining element. The gravity feed rack includes a retaining mechanism having an axially rotatably mounted shaft. The front retaining element is connected to the shaft. The front retaining element is moveable to a first retaining position to inhibit movement of a first load carrier. The rear retaining element is connected to the shaft and moveable to a second retaining position to inhibit movement of a second load carrier. When the gravity feed rack and the pick-up rack are brought together, at least one contact surface of a deflection element is configured to cooperate with the engagement element in order to rotate the shaft counter to a restoring force causing the front retaining element to move from the first retaining position and the rear retaining element to move to the second retaining position.

20 Claims, 5 Drawing Sheets

(51) Int. Cl.
*B65G 47/88* (2006.01)
*B65G 1/08* (2006.01)

(58) Field of Classification Search
CPC .............. B65G 47/88; B65G 47/8823; B65G 47/8876; B65G 47/5109; B65G 47/82; B65G 47/04; B65G 47/26; B65G 47/266; B65G 47/295; B65G 15/00; B65G 15/28; B65G 41/008; B65G 41/005; B65G 37/00; B60P 1/43; B25J 5/007
USPC ................. 414/309, 331.07, 389, 397, 402
See application file for complete search history.

(56) References Cited

U.S. PATENT DOCUMENTS

| | | | |
|---|---|---|---|
| 7,261,511 B2 * | 8/2007 | Felder | B23Q 7/10 414/389 |
| 9,637,318 B2 | 5/2017 | Messina | |
| 2016/0220038 A1 * | 8/2016 | Simpson | B65G 1/08 |

* cited by examiner

HANDLING SYSTEM FOR THE AUTOMATIC TRANSFER AND SEPARATION OF LOAD CARRIERS

CROSS-REFERENCE TO RELATED APPLICATIONS

This application claims priority to and the benefit of German Patent Application No. 102020211816.7, filed on Sep. 22, 2020. The disclosure of the above application is incorporated herein by reference.

FIELD

The present disclosure relates to a handling system for the automatic transfer and separation of load carriers.

BACKGROUND

The statements in this section merely provide background information related to the present disclosure and may not constitute prior art.

The systematic storage, handling and the transport of load carriers, such as for example boxes, packages or pallets, is important in various fields. In addition to the logistics, this also includes the production, for example automobile production. In this context, gravity feed racks, among other things, are used. The load carriers move in the gravity feed racks on a slightly inclined track, due to gravity, from an acceptance side to a discharge side. According to the FIFO (First In, First Out) principle, the load carrier which has been added first to the acceptance side may also be removed again first on the discharge side. Simple variations of the track, which is generally configured as a roller track, have only one stationary retaining device on the discharge side which inhibits the load carriers from moving forward and falling off the gravity feed rack. In addition, variations are also known in which a movable retaining device releases the load carrier furthest to the front on the discharge side when this load carrier is to be accepted by a pick-up rack. Systems having a retaining device or, respectively, separating device, which serves to hold back the following load carrier from the load carrier furthest to the front until the load carrier furthest to the front has been removed, are also known. These systems, however, are generally provided for manual operation and are not designed for a fully automatic process. There is also no possibility of driving up to the gravity feed rack on the discharge side in order to accept the load carrier.

In the context of efficient industrial production, load carriers, for example small load carriers, are also transported by self-propelled robot units between different stations inside the production plant. The robot unit which may have, for example, a drivable, self-controlled substructure and a platform or, respectively, a rack arranged thereon, automatically activates the stations at which load carriers are to be received and/or discharged. In principle, the loading and unloading at the individual stations could take place manually but this impairs the efficiency of the entire process and opens up additional sources of error, since in each case an operator has to interrupt his other activities. In this regard, an automation of the acceptance (or, respectively, transfer) of the load carrier is desirable. In the case of a gravity feed rack, a reliable mechanism is desired. The mechanism holding back the load carrier furthest to the front on the discharge side until this load carrier is accepted when the mobile robot unit has approached the respective station. This relates both to cases in which the station has a gravity feed rack and also cases in which the robot unit has a gravity feed rack, from which one or more load carriers are to be transferred to the station. The system is configured to assist the gravity feed rack being approached from the front for the transfer of the load carrier. In order to inhibit the following load carriers being inadvertently accepted therewith, the mechanism may also have a separating device which also has to be triggered in a reliable manner. In addition to reliability, the mechanism should also have a simple design and a high degree of robustness.

U.S. Pat. No. 7,261,511 B2 discloses a pick-up and delivery system for use with mobile robots, each thereof having at least one rack. Each rack has a stop bar with a holding device. The system uses a plurality of stations, each thereof having at least one pallet holding surface in order to receive at least two pallets. The pallet holding surfaces are provided in each case with a holding device in the receiving region and in the delivery region. The pallets are used in order to receive the objects to be transferred, wherein each of the pallets has a securing device which cooperates with the holding device and the retaining device. The mobile robot receives a pallet from a first station and delivers the pallet to a second station.

An automated transport system with a goods frame which is mounted on an automated transport robot is disclosed in WO 2020/050309 A1. Stop mechanisms which are provided on the front face of the goods rack may adopt a retaining state, by the forward movement of the goods being restricted from the racks forming the goods rack, and a release state by the restriction being canceled. The stop mechanisms have operating parts which protrude from the front face of the goods rack to the front. When these operating parts are in contact with the receiving plates on a goods receiving opening side of the second racks, and are pushed to the rear relative to the goods frame, the stop mechanisms are displaced from the retaining state into the release state.

U.S. Pat. No. 9,637,318 B2 discloses a mobile robot device with a conveyor which is designed to be connected to a further conveyor of a second mobile robot device. In this manner, the mobile robot devices may form integrated flexible conveyors and make it possible to connect conveyors in order to produce an aggregate conveyor of any type or size. The mobile robot device is configured such that it receives a conveyor from a storage unit and moves the conveyor to a different point within a physical space. The mobile robot device also has the capability of rotating the conveyor when it is docked thereon, about the axis of the mobile robot device (for example for sorting and for other operations).

In view of the prior art set forth, the automatic acceptance of load carriers from a gravity feed rack still leaves further room for improvement.

SUMMARY

This section provides a general summary of the disclosure and is not a comprehensive disclosure of its full scope or all of its features.

The present disclosure provides improved means for the separation and for the automatic acceptance of load carriers from a gravity feed rack.

In one form, the present disclosure discloses a handling system for automatically transferring and separating load carriers. The handling system comprises a gravity feed rack, a pick-up rack, a front retaining element, a rear retaining element, at least one engagement element, a deflection element, and at least one contact surface. The gravity feed rack includes a retaining mechanism having an axially rotatably mounted shaft. The pick-up rack cooperates with the gravity feed rack for accepting the load carriers on a discharge side of the gravity feed rack. The front retaining element is on the discharge side of the gravity feed rack and is connected to the shaft. The front retaining element is moveable to a first retaining position to inhibit movement of a first load carrier of the load carriers. The rear retaining element is connected to the shaft. The rear retaining element is moveable to a second retaining position to inhibit movement of a second load carrier of the load carriers. The contact surface extends obliquely to an axial direction of the shaft. When the gravity feed rack and the pick-up rack are brought together, the deflection element is configured to cooperate with the engagement element via the contact surface in order to rotate the shaft counter to a restoring force causing the front retaining element to move from the first retaining position and the rear retaining element to move to the second retaining position. The dependent claims relate to advantageous variations of the disclosure.

It should be mentioned that the features and measures set forth individually in the following description may be combined together in any technically expedient manner and reveal further forms of the disclosure. The description specifies the disclosure additionally, in particular, in combination with the figures.

A handling system for the automatic transfer of load carriers is provided by means of the disclosure. In this context, the term "handling" refers both to the storage and the transport as well as the transfer and separation of load carriers. The load carriers may, in particular, be small load carriers, for example boxes comprising components which are used in a production plant. The handling system has a gravity feed rack and a pick-up rack which may be brought together for accepting the load carrier on the discharge side. In the known manner, the gravity feed rack has an inclined track which extends from an acceptance side to a discharge side. In order to assist the movement of the load carriers from the acceptance side to the discharge side due to gravity, the track is preferably configured in a manner which reduces friction and as a roller track or ball track. The pick-up rack in this context generally is any type of device which is configured to accept at least one load carrier from the gravity feed rack. Among other things, the pick-up rack may have in turn a second gravity feed rack or, respectively, may be configured as a second gravity feed rack. For the acceptance of the load carrier, i.e. in order to accept at least one load carrier from the gravity feed rack, the pick-up rack is able to be brought together with the gravity feed rack. In other words, the pick-up rack and the gravity feed rack approach one another or, respectively, are brought together, which may be based on a movement of the pick-up rack and/or a movement of the gravity feed rack. Generally either the pick-up rack or the gravity feed rack is configured to be mobile, but both could be configured to be mobile. The pick-up rack on the discharge side, i.e. on the discharge side of the gravity feed rack, is brought together with the gravity feed rack, i.e. approaches said gravity feed rack for accepting the load carrier.

The gravity feed rack has a retaining mechanism with an axially rotatably mounted shaft. The retaining mechanism is configured for retaining at least one load carrier on the gravity feed rack, i.e. the movement of at least one load carrier toward the discharge side is restricted by the retaining mechanism. The precise design of the retaining mechanism is described further hereinafter. The retaining mechanism has an axially rotatably mounted shaft. The aforementioned shaft is, for example, rotatably mounted relative to a frame of the gravity feed rack, for example by plain bearings or rolling bearings. Here and hereinafter, "frame of the gravity feed rack" denotes in the broadest sense all of the parts of the gravity feed rack which are immovably connected together and optionally a structure supporting the gravity feed rack. The shaft is preferably configured in one piece, even though a form with a plurality of parts which are connected together fixedly in terms of rotation might also be conceivable. Here and hereinafter, "axial" or, respectively, "axial direction" denotes the direction of the rotational axis of the shaft which generally coincides with its axis of symmetry. The tangential and the radial direction are also defined by the axial direction. The axial direction normally lies within a vertical plane with the direction of extension of the gravity feed rack and may coincide, in particular, with this direction of extension. In other words, in this case the shaft runs parallel to the gravity feed rack.

According to the disclosure, a front retaining element on the discharge side and a rear retaining element, which are configured in one respective retaining position to hold back load carriers, as well as at least one engagement element, are connected in each case to the shaft so as to be rotationally blocked. The aforementioned elements are connected to the shaft so as to be rotationally blocked, i.e. they may be rotated if necessary to a limited extent relative to the shaft, for example due to a resilient connection. Normally the connection may be regarded as fixed in terms of rotation so that no or very little rotation is possible relative to the shaft. In some variations, at least one (or even all) of the aforementioned elements may be configured in one piece with the shaft. In any case, it is achieved that the elements are connected together via the shaft so that a rotation of one of the elements about the axial direction causes a rotation of the other elements.

At least two retaining elements are provided, one thereof being arranged at the front relative to the discharge side, and thus being denoted as the front retaining element, while the other is arranged further to the rear relative to the discharge side (i.e. toward the acceptance side). Each of the retaining elements is configured to hold back a load carrier in a retaining position, i.e. to restrict the movement thereof inside the gravity feed rack. There are very different possibilities regarding the design of the retaining elements. According to one variation, for example, each retaining element may be configured in a rod-like manner and protrude radially from the shaft, wherein the two retaining elements are offset to one another both axially and also tangentially. The front retaining element is configured to hold back at least the load carrier furthest to the front, while the rear retaining element is configured to hold back at least one load carrier arranged to the rear thereof (i.e., toward the acceptance side). The spacing between the front and the rear retaining element normally corresponds in this case approximately to the length of one or more load carriers. The rear retaining element may also be regarded as a separating element which may separate at least one rear load carrier from at least one front load carrier. In this regard, the rear retaining element serves for separating the load carriers. In addition to the retaining position, each retaining element may also adopt a release position in order to release the movement of the respective load carrier. It goes without saying that the adoption of the retaining position depends on the respective rotary angle of the shaft to which the retaining elements are connected. The rotation of the shaft may in turn be caused by the action of an external force or, respectively, an external torque. The contact point or, respectively, the contact surface for this external force is arranged on at least one engagement element which, as explained above, is connected to the shaft so as to be rotationally blocked.

Moreover, according to the disclosure, when the gravity feed rack and pick-up rack are brought together, a deflection element is configured to cooperate with the engagement element via at least one contact surface running obliquely to the axial direction, in order to rotate the shaft counter to a restoring force from a retaining position of the front retaining element into a retaining position of the rear retaining element. As described further hereinafter, the deflection element may be secured either to the gravity feed rack or the pick-up rack. In any case, the deflection element is configured to cooperate with the engagement element via a contact surface running obliquely to the axial direction. The contact surface which may be configured as a whole to be planar or non-planar (i.e. curved and/or angled back) runs obliquely to the axial direction, i.e. neither parallel nor perpendicular thereto. In the case of a curved contact surface, the angle relative to the axial direction is defined by the angle between the axial direction and the tangential plane in the region of the contact between the deflection element and the engagement element. The angle is normally between 10° and 60°. The corresponding contact surface may be configured either on the engagement element or on the deflection element. Corresponding oriented contact surfaces could also be provided on both elements. If the contact surface is configured on the deflection element and this deflection element is secured to the pick-up rack, the description of the orientation of the contact surface refers to the state in which the pick-up rack and the gravity feed rack approach one another as configured for transferring the load carriers. If the gravity feed rack and the pick-up rack are brought together, a relative movement takes place which causes a rotation of the shaft.

The deflection element is configured such that, as a result of this relative movement, the deflection element cooperates with the engagement element via the contact surface. Since the contact surface runs obliquely to the axial direction, it is possible to compensate for a force deflection so that an axial force or, respectively, force component exerted on the deflection element leads to a tangential force on the engagement element. The engagement element and the deflection element may slide along one another parallel to the contact surface, while a compressive force is transmitted perpendicular to the contact surface. The corresponding force in turn causes a torque by which the shaft is rotated.

In this case, the shaft is rotated counter to a restoring force from a retaining position of the front retaining element into a retaining position of the rear retaining element. In other words, before bringing together the gravity feed rack and pick-up rack, the front retaining element is in its retaining position, whereby the movement of at least the load carrier furthest to the front is inhibited. By the cooperation of the deflection element and engagement element, the shaft is rotated such that the front retaining element is rotated out of its retaining position into a release position, while the rear retaining element is rotated out of a release position into a retaining position. In the aforementioned retaining position, the rear retaining element may inhibit the movement of at least one rear load carrier due to gravity. In cooperation, the displacement of the two retaining elements has the effect that at least one front load carrier may move from the gravity feed rack on the discharge side to the pick-up rack and thus is accepted by the pick-up rack while at the same time it is inhibited that one or more load carriers arranged further to the rear inadvertently follow. Thus, the controlled acceptance of one or more load carriers is possible. The rotation of the shaft takes place counter to a restoring force which may be generated by at least one resilient restoring element, for example a spring, which acts directly or indirectly on the shaft. This restoring force provides that the shaft rotates back again when the pick-up rack and gravity feed rack have moved away from one another. In this case, the rear retaining element returns into its release position and the front retaining element returns into its retaining position. As a result, load carriers halted by the rear retaining element may move toward the discharge side, where they are finally halted by the front retaining element. The load carriers may be accepted by the pick-up rack, for example, in the case of a subsequent transfer.

The handling system according to the present disclosure permits a reliable, controlled acceptance or, respectively, transfer of one or more load carriers from the gravity feed rack to the pick-up rack. A reliable coordination of the individual movements is provided by the connection of the retaining elements and at least one engagement element via the shaft. It is also regarded as advantageous if the movement due to the cooperation of the deflection element and engagement element is initiated by the oblique contact surface. As described, normally the engagement element and deflection element slide along parallel to the contact surface while a compressive force is transmitted perpendicular to the contact surface. Such a compressive force normally permits a more immediate, more reliable response of the mechanism than, for example, a tensile force which is transmitted via a cable pull. As a whole, the retaining mechanism may be implemented in a simple and robust manner, whereby, on the one hand, it is cost-effective and, on the other hand, reliable and low-maintenance.

According to one form, the gravity feed rack and/or the pick-up rack are part of a self-propelled robot unit. In this case, the above-described retaining mechanism permits, for example, an automatic driving of the robot unit with the pick-up toward a stationary rack unit with the gravity feed rack and the reliable transfer of load carriers to the robot unit. On the other hand, the pick-up rack may also be part of a stationary rack unit and the gravity feed rack part of a self-propelled robot unit which automatically drives toward the rack unit in order to transfer one or more load carriers thereto. As already mentioned above, the pick-up rack may also be configured in turn as a (second) gravity feed rack. It is also possible that, for example, both the stationary rack unit and the robot unit have two gravity feed racks arranged one above the other, in each case with an opposing inclination. For example, when brought together, the upper gravity feed rack of the rack unit could transfer at least one load carrier to the upper gravity feed rack (functioning as a pick-up rack) of the robot unit while the lower gravity feed rack of the robot unit transfers at least one load carrier to the lower gravity feed rack (functioning as a pick-up rack) of the rack unit.

According to another form, the deflection element has the contact surface and is secured to the pick-up rack, wherein the engagement element protrudes radially from the shaft. The deflection element is secured to the pick-up rack and may be fastened, for example, in a stationary manner relative thereto, either directly to the pick-up rack or together with the pick-up rack to a superordinate unit. In some circumstances, it may also be regarded as part of the pick-up rack. For example, in the above-mentioned form, the deflection element may be part of the self-propelled robot unit and movable therewith. When guiding the pick-up rack to the gravity feed rack (or, respectively, vice versa), the engagement element thus approaches the deflection element and cooperates therewith. The engagement element protrudes radially from the shaft and, for example, may be configured to be rod-shaped or bar-shaped. The engagement element may run parallel to the radial direction or even at an angle thereto. The deflection element cooperating therewith may be configured, for example, in a wedge-like manner and have the oblique contact surface on one side. When the contact surface is brought into contact with the engagement element, the engagement element is deflected, wherein the contact surface slides along the engagement element.

Different possibilities exist regarding the generation of the aforementioned restoring force. According to one form, a tension spring acting at least indirectly on the shaft generates the restoring force. In this case, the tension spring is normally already preloaded under tension in the retaining position of the front retaining element, wherein the spring is expanded when displaced into the retaining position of the rear retaining element and thus the tensile stress in the spring is increased. In some circumstances, the spring may act, on the one hand, directly on the shaft and, on the other hand, on a stationary frame of the gravity feed rack.

In yet another form of the present disclosure, the gravity feed rack has the deflection element and the deflection element is displaceably mounted relative to the shaft in an axial direction. In this form, the deflection element may also be regarded as part of the retaining mechanism. The deflection element is displaceably mounted relative to the shaft in the axial direction, wherein a guide may be provided by which a rotation of the deflection element may be at least restricted relative to a reference point of the gravity feed rack. In this case, the deflection element may be axially displaced, but not together with the shaft, about the axial rotational axis thereof. Preferably, the deflection element at least substantially surrounds the shaft in the tangential direction, for example in the manner of a casing or a sleeve. Since the deflection element and the engagement element in the form described herein are both secured to the gravity feed rack, the forces acting on the contact surface relative to the gravity feed rack are internal forces which may not be displaced as a whole. The lateral force components generated on the contact surface are not able to destabilize the gravity feed rack. The same applies to the pick-up rack, in this form no lateral opposing forces acting thereon.

Preferably at least one contact surface is configured on a helical guide track and cooperates with a radially extending projection. The guide track is configured in a helical manner or as a type of helix. In the case, the axial rotational axis of the shaft in this case normally forms the central axis of the helix. The guide track may either be configured on the part of the deflection element or on the part of the engagement element, wherein the projection corresponds to the respective other element. The guide track is a recess, for example a groove or a slot, into which the aforementioned projection engages. In this case, the contact surface is arranged on the edge of the guide track. Advantageously, a plurality of such guide tracks may also be provided. In particular, this form may be combined with the aforementioned form, in which the deflection element is configured in a sleeve-like manner and at least substantially, in particular fully, surrounds the shaft in the tangential direction. In this case, for example, one or more guide tracks may be configured as grooves inside the deflection element, wherein a projection which is configured externally on the shaft and which forms an engagement element engages in each guide track.

As mentioned above, a rotation of the deflection element about the axial rotational axis of the shaft is restricted or, respectively, inhibited. According to one form, this is achieved by the deflection element having a guide pin which engages in an axially extending guiding slide. Such a guide pin may protrude, for example, radially outwardly from a sleeve-like deflection element. The guide pin engages in the guiding slide and thus is guided therein. The guiding slide may be configured, for example, as a groove or slot. The guiding slide may run parallel to the axial direction. The guiding slide may in turn be configured on a frame of the gravity feed rack. The guiding slide may be arranged, for example, below the deflection element, wherein the guide pin protrudes downwardly from the deflection element.

According to one form, the guide pin terminates inside the guiding slide, for example when this guiding slide is configured as a groove. According to a further form in which the guiding slide is configured as a guide slot, a contact portion of the guide pin protrudes through the guiding slide so that a contact element secured to the pick-up rack, when the gravity feed rack and pick-up rack are brought together, may exert via the contact portion an at least partially axial compressive force on the guide pin. The contact portion is normally an end portion of the guide pin and may correspond, for example, to the lowest portion thereof. Since it protrudes through the guiding slide, it is accessible and may be actuated to a certain extent by a contact element on the part of the pick-up rack. In this case, the contact element exerts an at least partially axially acting compressive force on the guide pin. The contact element is normally fastened in a stationary manner to the pick-up rack so that its movement relative to the gravity feed rack corresponds to that of the pick-up rack The guide pin is displaced by the compressive force inside the guiding slide, a displacement of the entire deflection element resulting therefrom in turn. This leads in turn to the rotation of the shaft, by the cooperation of the deflection element and the engagement element.

Advantageously, a spring acts on the deflection element and the deflection element cooperates with the engagement element in order to generate the restoring force on the shaft. In other words, in this form, it is not only the rotation of the shaft from the retaining position of the front retaining element into the retaining position of the rear retaining element which is based on the cooperation of the deflection element and the engagement element, but also the reverse rotation. To this end, the deflection element may cooperate with the engagement element via a restoring surface which also runs obliquely to the axial direction. In the case of the above-mentioned helical guide track, the contact surface and the restoring surface are configured on sides of the guide track opposing one another. The spring may be configured as a tension spring or, in particular, as a compression spring. The spring may be positioned directly or indirectly, on the one hand, on the deflection element and, on the other hand, on a frame of the gravity feed rack.

Preferably, the spring is configured as a helical spring and surrounds the shaft. For example, the spring may be arranged axially adjacent to an aforementioned sleeve-shaped deflection element which in turn also surrounds the shaft. The design described herein, on the one hand, permits a compact form and, on the other hand, promotes a symmetrical force distribution onto the deflection element which may facilitate the axial movement thereof along the shaft. Moreover, when arranged around the shaft, the spring is always oriented in a linear manner and, for example, not guided in a curve or angled back, which could impair its function.

In another form, the present disclosure discloses a handling system for automatically transferring and separating load carriers. The handling system comprises a gravity feed rack, a pick-up rack, a front retaining element, a rear retaining element, at least one engagement element, a deflection element, and at least one contact surface. The gravity feed rack includes a retaining mechanism having an axially rotatably mounted shaft. The pick-up rack cooperates with the gravity feed rack for accepting the load carriers on a discharge side of the gravity feed rack. The front retaining element is on the discharge side of the gravity feed rack and is connected to the shaft. The front retaining element is movable between a first retaining position in which movement of a first load carrier of the load carriers is inhibited and a first release position in which movement of the first load carrier is allowed. The rear retaining element is connected to the shaft. The rear retaining element is movable between a second retaining position in which movement of a second load carrier of the load carriers is inhibited and a second release position in which movement of the second load carrier is allowed. The contact surface extends obliquely to an axial direction of the shaft. When the gravity feed rack and the pick-up rack are brought together, the deflection element is configured to cooperate with the at least one engagement element via the contact surface in order to rotate the shaft counter to a restoring force causing the front retaining element to move into the first release position and the rear retaining element to move into the second retaining position.

In yet another form, the present disclosure discloses a handling system for automatically transferring and separating load carriers. The handling system comprising a gravity feed rack, a pick-up rack, a front retaining element, a rear retaining element, at least one engagement element, a deflection element, and a biasing member. The gravity feed rack includes a retaining mechanism having an axially rotatably mounted shaft. The pick-up rack cooperates with the gravity feed rack for accepting the load carriers on a discharge side of the gravity feed rack. The front retaining element is on the discharge side of the gravity feed rack and is connected to the shaft. The front retaining element is moveable to a first retaining position to inhibit movement of a first load carrier of the load carriers. The rear retaining element is connected to the shaft. The rear retaining element is moveable to a second retaining position to inhibit movement of a second load carrier of the load carriers. The deflection element is secured to the pick-up rack and includes at least one contact surface extending obliquely to an axial direction of the shaft. The biasing member acts on the shaft. When the gravity feed rack and the pick-up rack are brought together, the deflection element is configured to cooperate with the engagement element via the contact surface in order to rotate the shaft counter to a restoring force of the biasing member, which causes the front retaining element to move from the first retaining position and the rear retaining element to move to the second retaining position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
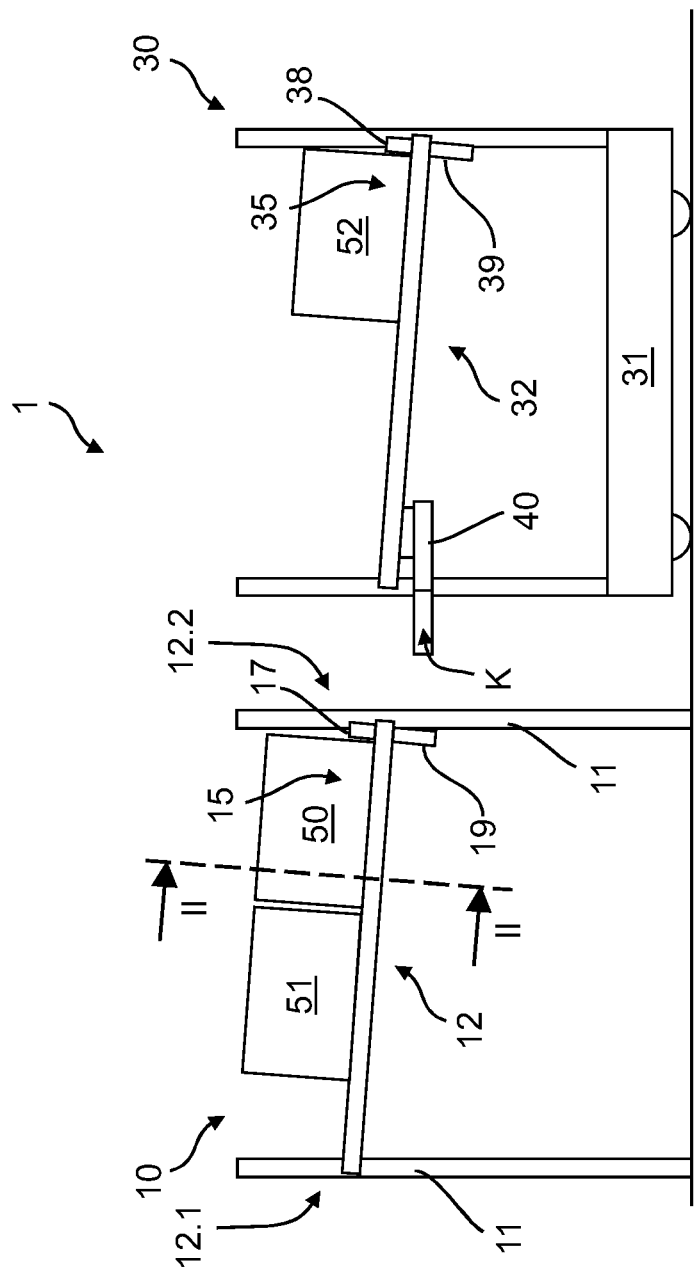
FIG. 1 is a schematic side view of a first form of a handling system in a first state according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the various figures the same parts are always provided with the same reference numerals which is why generally these parts are only described once.

FIGS. 1 to 5 show a first form of a handling system 1 according to the present disclosure for small loading carriers 50-52 which may be used, for example, during the course of a production process in the automobile industry. In FIG. 1, a stationary rack unit 10 is shown with a first gravity feed rack 12 which is mounted on a frame 11. On the first gravity feed rack 12 a first small load carrier 50 is arranged in the vicinity of a discharge side 12.2 of the gravity feed rack 12 and a second small load carrier 51 is arranged further toward an acceptance side 12.1. The small load carriers 50, 51 may move on a roller track 13 (FIG. 2), due to gravity, toward the discharge side 12.2 which is located to the rear of the gravity feed rack 12.

Figure 2:
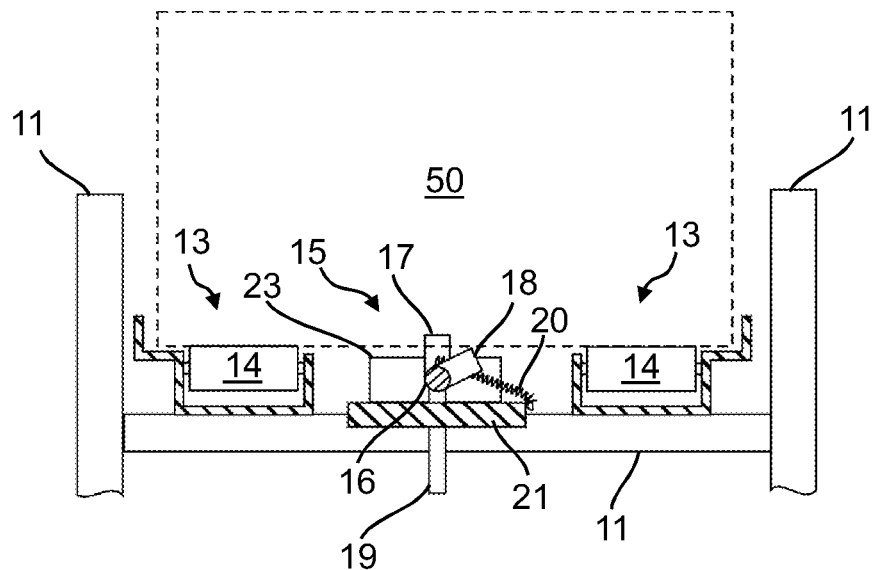
FIG. 2 is a schematic cross-sectional view corresponding to the line II-II of FIG. 1.
Figure 3:
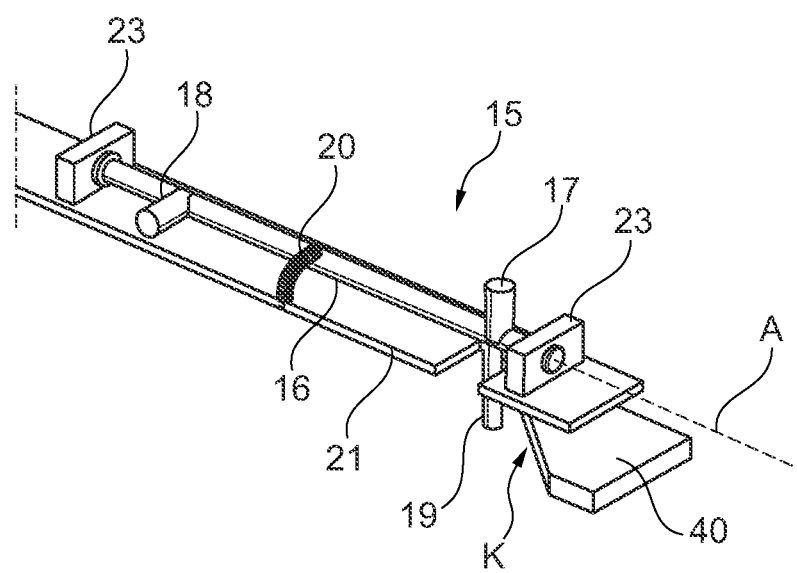
FIG. 3 is a perspective view of a retaining mechanism of the handling system of FIG. 1 in the first state.
Figure 5:
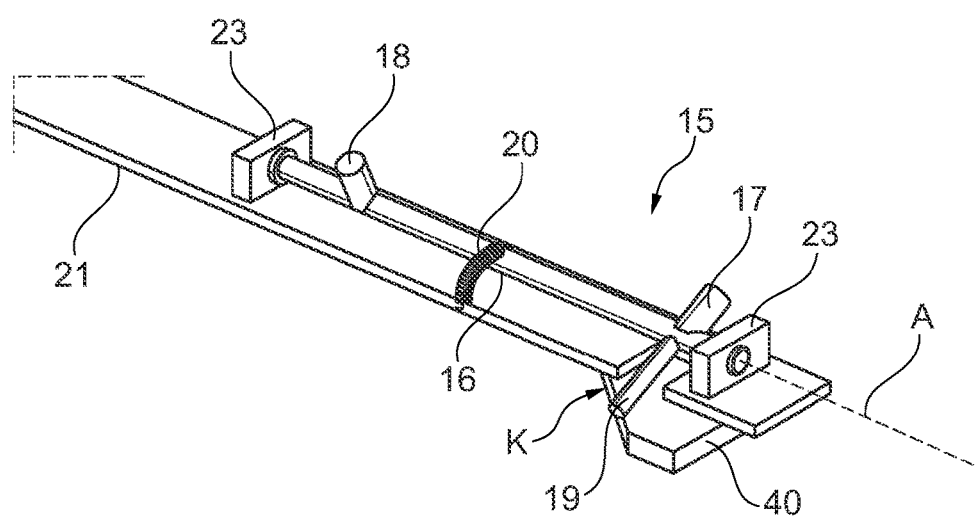
FIG. 5 is a perspective view of the retaining mechanism in the second state.

In order to control the carriers 50, 51 movement, the first gravity feed rack 12 has a retaining mechanism 15 which is shown in detail in FIGS. 2, 3 and 5. Two bearing blocks 23 are fastened to a base plate 21 which is connected to the frame 11 (or may also be regarded as part thereof). In turn, a rigid shaft 16 is rotatably mounted thereon, wherein the axis of symmetry and rotational axis of the shaft 16 defines an axial direction A. In each case, a front retaining element 17 on the discharge side, a rear retaining element 18 and an engagement element 19 are all connected to (i.e., fixed for rotation with) the shaft 16. The aforementioned elements 17-19 have in the present example the shape of round bars protruding radially from the shaft 16 which, however, is to be understood by way of example. A tension spring 20 which is configured as a helical spring acts laterally on the shaft 16 and is also fastened to the base plate 21. The tension spring 20 is preloaded in order to hold the shaft 16 in the position shown in FIG. 3. The two retaining elements 17, 18 are firstly axially and secondly tangentially offset to one another. As shown in FIGS. 1-3, the front retaining element extends upwardly, while the rear retaining element 18 is inclined to the side. Thus, the front retaining element protrudes upwardly into the region in which the first load carrier 50 is located when it is positioned on the rollers 14 of the roller track 13. Thus, the movement of the first small load carrier 50 is restricted by the front retaining element 17. The rear retaining element 18, however, does not protrude into the aforementioned region (FIG. 2), so that it does not influence the movement of the small load carriers 50, 51. In the state shown in FIGS. 1 to 3, the front retaining element 17 of the retaining mechanism 15 is in a retaining position and the rear retaining element 18 of the retaining mechanism 15 is in a release position.

A self-propelled robot unit 30 is also shown in FIG. 1, in which a robot 31 bears a second gravity feed rack or pick-up rack 32. The construction of the second gravity feed rack 32 in this example does not differ substantially from that of the first gravity feed rack 12 and thus is not described further. In this case, a retaining mechanism 35 which corresponds to the retaining mechanism 15 of the first gravity feed rack 12 is also provided. A third load carrier 52 is held in its position by a front retaining element 38 of the retaining mechanism 35. The second gravity feed rack 32 forms in this case a pick-up which is able to be brought together with the first gravity feed rack 12 for the transfer or, respectively, acceptance of small load carriers 50-52. A deflection element 40 is fastened to the lower face of the second gravity feed rack 32. As shown in FIG. 3, this deflection element 40 is plate-shaped and has a contact surface which runs obliquely to the axial direction A. In this example, the angle is 40° with respect to the axial direction A when the robot unit 30 is oriented as intended relative to the rack unit 10.

Figure 4:
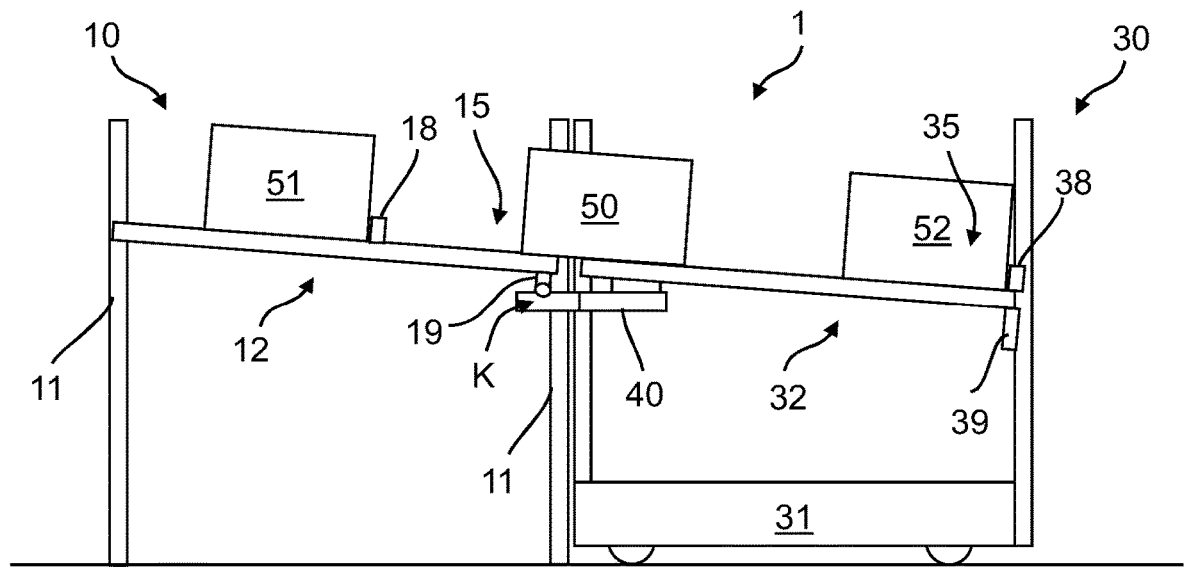
FIG. 4 is a schematic side view of the handling system of FIG. 1 in a second state.

If the robot unit 30 drives up closer to the rack unit 10, the deflection element 40 cooperates with the engagement element 19 via the contact surface K. The two elements 19, 40 slide along one another, wherein an at least partially tangential force acts on the engagement element 19. As a result, the shaft 16 is rotated counter to a restoring force generated by the spring 20 from the retaining position of the front retaining element 17 into a retaining position of the rear retaining element 18 (FIG. 5). As a result, first a release position of the front retaining element 17 is achieved so that the first small load carrier 50 may move from the first gravity feed rack 12 to the second gravity feed rack 32, due to gravity, as illustrated in FIG. 4. Second, the second small load carrier 51 is halted by the rear retaining element 18 now located in a retaining position, so that it is no longer able to move further toward the discharge side 12.2. After the first small load carrier 50 has been accepted by the second gravity feed rack 32, the robot unit 30 moves away again from the rack unit 10 so that the deflection element 40 releases the engagement element 19. Due to the action of the spring 20, the shaft 16 is pulled back again into the retaining position of the front retaining element 17 and into the release position of the rear retaining element 18. Accordingly, the second small load carrier 51 may now move into the position previously adopted by the first small load carrier 50, due to gravity.

As already mentioned above, the second gravity feed rack 32 has a retaining mechanism 35 which corresponds to the retaining mechanism 15 of the first gravity feed rack 12. The mobile robot unit 30 thus may discharge the third small load carrier 52 in a controlled manner in the case of a further stationary rack unit (not shown here), if the aforementioned rack unit has a correspondingly positioned and configured deflection element, by which an engagement element 39 of the retaining mechanism 35 may be operated.

In this example, in each case, only one gravity feed rack 12, 32 of the rack unit 10 and the robot 30 is shown. It goes without saying that, however, in each case both units 10, 30 could also have two or more gravity feed racks arranged one above the other, wherein for example a transfer of a small load carrier from the rack unit 10 to the robot unit 30 and a transfer of a different load carrier from the robot unit 30 to the rack unit 10 could also take place at the same time, for example in order to replace empty load carriers for full load carriers.

Figure 6:
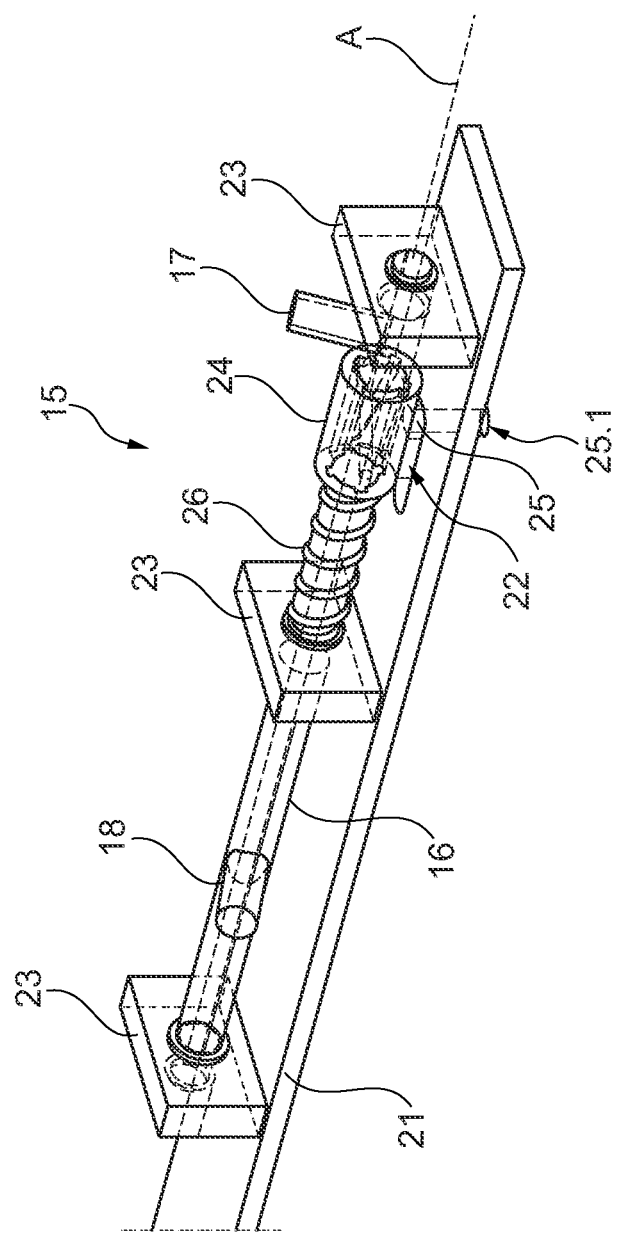
FIG. 6 is a perspective view of a retaining mechanism of a second form of a handling system according to the present disclosure.
Figure 7:
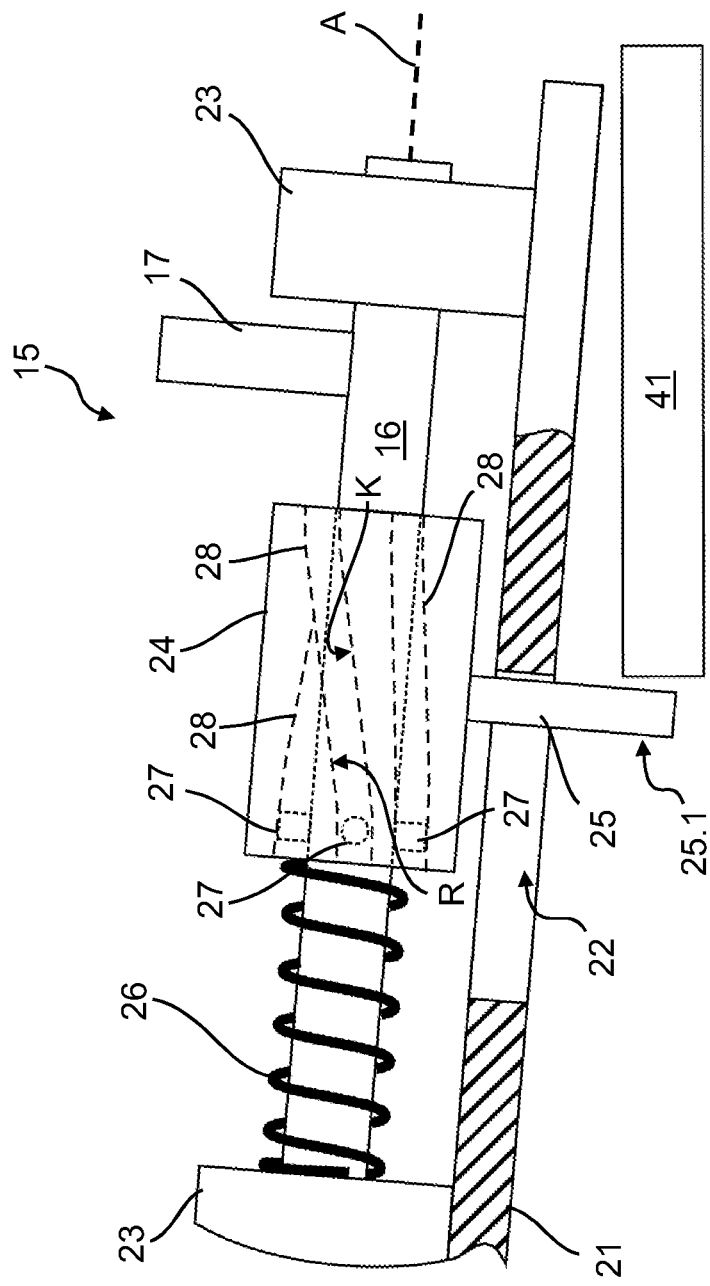
FIG. 7 is a partial cross-sectional view of the retaining mechanism of FIG. 6.

FIGS. 6 and 7 show a retaining mechanism 15 of a handling system according to a second form. Three bearing blocks 23, in which in turn a rigid shaft 16 is rotatably mounted, are fastened to a base plate 21. A front retaining element 17 and a rear retaining element 18 which do not differ substantially from those of the first form are provided. However, in this case a deflection element 24 is integrated in the retaining mechanism 15. The deflection element 24 is configured to be sleeve-like and surrounds the shaft 16 in a tangentially circulating manner in a partial region. The deflection element 24 has a downwardly oriented guide pin 25 which protrudes through a slotted guiding slide 22.

As shown in FIG. 7, a pick-up rack which is part of a mobile robot unit 30, for example, may act with a suitably positioned contact element 41 on a lower contact portion 25.1 of the guide pin 25, whereby the guide pin 25 and the entire deflection element 24 are moved axially relative to the shaft 16. In this case, the movement of the guide pin 25 is restricted by the shape of the axially extending guiding slide 22. In the example illustrated, the deflection element 24 is not able to rotate about the rotational axis of the shaft 16. Four projections 27, which are offset in each case tangentially by 90° and which serve as engagement elements, are fixed for rotation with the shaft 16. Each projection 27 engages in a guide track 28 configured as a groove on an inner face of the deflection element 24. The guide tracks 28 are configured in each case to be helical. A contact surface K running obliquely to the axial direction A is configured on one side of the respective guide track 28, while a restoring surface R which also runs obliquely to the axial direction A is configured on the opposing side.

If the deflection element 24 is axially deflected by the contact element 41, as described above, the cooperation of the projections 27 with the contact surface K causes a rotation of the shaft 16 in a similar manner to the first exemplary form. It is advantageous here, however, that as a whole, no lateral force acts on the rack unit 10 or the robot unit 30. The displacement of the deflection element 24 and the shaft 16 takes place counter to a restoring force which is exerted by a compression spring 26 configured as a helical spring between the bearing block 23 and the deflection element 24. If the contact element 41 is pulled back again from the contact region 25.1, the compression spring 26 pushes the deflection element 24 back again into the initial position shown in FIG. 7, wherein a restoring force or, respectively, a restoring torque acts on the projections 27 and thus on the shaft 16 via the restoring surface R.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A handling system for automatically transferring and separating load carriers, the handling system comprising:
   a gravity feed rack including a retaining mechanism having an axially rotatably mounted shaft;
   a pick-up rack cooperating with the gravity feed rack for accepting the load carriers on a discharge side of the gravity feed rack;
   a front retaining element on the discharge side of the gravity feed rack and connected to the shaft, the front retaining element moveable to a first retaining position to inhibit movement of a first load carrier of the load carriers;
   a rear retaining element connected to the shaft, the rear retaining element moveable to a second retaining position to inhibit movement of a second load carrier of the load carriers;
   at least one engagement element connected to the shaft;
   a deflection element movable relative to the at least one engagement element; and
   at least one contact surface extending obliquely to an axial direction of the shaft,
   wherein when the gravity feed rack and the pick-up rack are brought together, the deflection element is configured to cooperate with the at least one engagement element via the at least one contact surface in order to rotate the shaft counter to a restoring force causing the front retaining element to move from the first retaining position and the rear retaining element to move to the second retaining position.

2. The handling system according to claim 1, wherein the gravity feed rack and/or the pick-up rack are part of a self-propelled robot unit.

3. The handling system according to claim 1, wherein the deflection element includes the at least one contact surface and is secured to the pick-up rack, and wherein the at least one engagement element protrudes radially from the shaft.

4. The handling system according to claim 1, further comprising a tension spring acting on the shaft and generating the restoring force.

5. The handling system according to claim 1, wherein the gravity feed rack includes the deflection element and the deflection element is displaceably mounted relative to the shaft in the axial direction.

6. The handling system according to claim 5, wherein the at least one contact surface is configured on a helical guide track of the deflection element, and wherein the at least one engagement element extends radially from the shaft and is configured to engage the at least one contact surface.

7. The handling system according to claim 5, wherein the deflection element includes a guide pin which protrudes through an axially extending guiding slide in the gravity feed rack, and wherein a contact element of the pick-up rack is configured to exert a force on the guide pin when the gravity feed rack and pick-up are brought together.

8. The handling system according to claim 6, wherein the deflection element has a guide pin which engages an axially extending guiding slide in the gravity feed rack.

9. The handling system according to claim 1, wherein the at least one contact surface is configured on a helical guide track of the deflection element, and wherein the at least one engagement element extends radially from the shaft and is configured to engage the at least one contact surface.

10. The handling system according to claim 1, wherein the deflection element has a guide pin which engages in an axially extending guiding slide in the gravity feed rack.

11. The handling system according to claim 1, wherein the deflection element includes a guide pin which protrudes through an axially extending guiding slide in the gravity feed rack, and wherein a contact element of the pick-up rack is configured to exert a force on the guide pin when the gravity feed rack and pick-up are brought together.

12. The handling system according to claim 1, further comprising a spring acting on the deflection element and generating the restoring force.

13. The handling system according to claim 12, wherein the spring is configured as a helical spring and surrounds the shaft.

14. A handling system for automatically transferring and separating load carriers, the handling system comprising:
   a gravity feed rack including a retaining mechanism having an axially rotatably mounted shaft;
   a pick-up rack cooperating with the gravity feed rack for accepting the load carriers on a discharge side of the gravity feed rack;
   a front retaining element on the discharge side of the gravity feed rack and connected to the shaft, the front retaining element movable between a first retaining position in which movement of a first load carrier of the load carriers is inhibited and a first release position in which movement of the first load carrier is allowed;
   a rear retaining element connected to the shaft, the rear retaining element movable between a second retaining position in which movement of a second load carrier of the load carriers is inhibited and a second release position in which movement of the second load carrier is allowed;
   at least one engagement element connected to the shaft;
   a deflection element movable relative to the at least one engagement element; and
   at least one contact surface extending obliquely to an axial direction of the shaft,
   wherein when the gravity feed rack and the pick-up rack are brought together, the deflection element is configured to cooperate with the at least one engagement element via the at least one contact surface in order to rotate the shaft counter to a restoring force causing the front retaining element to move into the first release position and the rear retaining element to move into the second retaining position.

15. The handling system according to claim 14, wherein the deflection element includes the at least one contact surface and is secured to the pick-up rack, and wherein the at least one engagement element protrudes radially from the shaft.

16. The handling system according to claim 14, further comprising a tension spring acting on the shaft and generating the restoring force.

17. The handling system according to claim 14, wherein the gravity feed rack includes the deflection element and the deflection element is displaceably mounted relative to the shaft in the axial direction.

18. The handling system according to claim 14, wherein the deflection element has a guide pin which engages in an axially extending guiding slide in the gravity feed rack.

19. The handling system according to claim 14, wherein the at least one contact surface is configured on a helical guide track of the deflection element, and wherein the at least one engagement element extends radially from the shaft and is configured to engage the at least one contact surface.

20. A handling system for automatically transferring and separating load carriers, the handling system comprising:
- a gravity feed rack including a retaining mechanism having an axially rotatably mounted shaft;
- a pick-up rack cooperating with the gravity feed rack for accepting the load carriers on a discharge side of the gravity feed rack;
- a front retaining element on the discharge side of the gravity feed rack and connected to the shaft, the front retaining element moveable to a first retaining position to inhibit movement of a first load carrier of the load carriers;
- a rear retaining element connected to the shaft, the rear retaining element moveable to a second retaining position to inhibit movement of a second load carrier of the load carriers;
- at least one engagement element connected to the shaft;
- a deflection element secured to the pick-up rack and including at least one contact surface extending obliquely to an axial direction of the shaft; and
- a biasing member acting on the shaft,
- wherein when the gravity feed rack and the pick-up rack are brought together, the deflection element is configured to cooperate with the at least one engagement element via the at least one contact surface in order to rotate the shaft counter to a restoring force of the biasing member, which causes the front retaining element to move from the first retaining position and the rear retaining element to move to the second retaining position.

* * * * *